No. 845,022. PATENTED FEB. 19, 1907.
G. F. WALKER.
CUP AND CUP HANDLE.
APPLICATION FILED NOV. 14, 1906.

Witnesses

Inventor
George F. Walker.
By Edwin Guthrie,
Attorney

UNITED STATES PATENT OFFICE.

GEORG F. WALKER, OF DEXTER, MICHIGAN.

CUP AND CUP-HANDLE.

No. 845,022.  Specification of Letters Patent.  Patented Feb. 19, 1907.

Application filed November 14, 1906. Serial No. 343,390.

*To all whom it may concern:*

Be it known that I, GEORG F. WALKER, a citizen of the United States, residing at Dexter, in the county of Washtenaw and State of Michigan, have invented certain new and useful Improvements in Cups and Cup-Handles, of which the following is a specification.

My invention relates to cups and handles; and the object of my invention is to provide any chosen receptacle or cup with a handle of particular construction and arrangement with respect to the body of the cup whereby the cup may be suspended in the ordinary way from a hook or like support by the loop of the handle, and, further, it may be suspended mouth uppermost upon the rim of a metal bucket of the customary pattern, and it may be thus suspended inside or outside of the bucket. Again, my invention by reason of the specially-constructed handle and the arrangement thereof that constitute my invention may be suspended bottom uppermost from the rim of a bucket or the like with the body of the cup either outside the bucket or inside of it when it is desired that the cup shall drain into the bucket. The object of suspending the cup within the bucket is to avoid any considerable projecting body outside the bucket when it is being carried, particularly, as is often the case, several cups are suspended at the same time from the rim of the larger receptacle, whatever it may be.

I accomplish the stated object by fashioning and associating parts, as illustrated in the accompanying drawings, of which—

Figure 1:
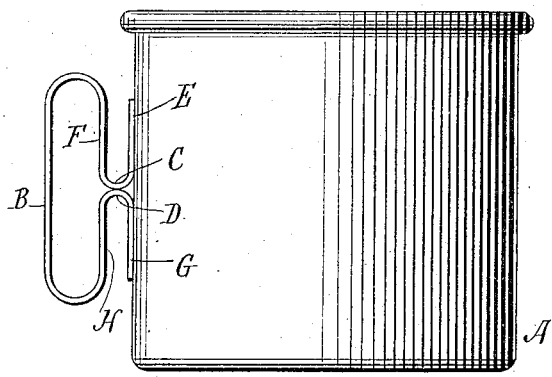
Figure 2:
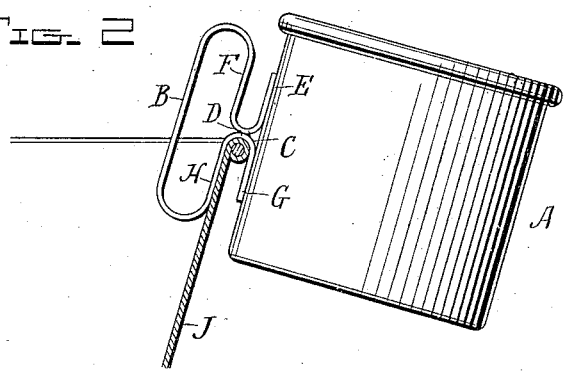
Figure 3:
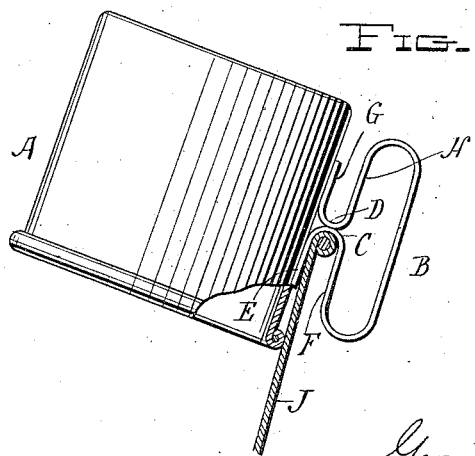

Figure 1 represents a side view of my invention. In Fig. 1 the scale of drawing is greater than in the remaining views. Fig. 2 is a sectional view showing my invention applied to a cup which is suspended outside a bucket and upon the rim thereof, and Fig. 3 is a like view showing a cup having the handle constructed and arranged in accordance with my invention and suspended bottom uppermost within a bucket.

Like reference-letters refer to the same parts throughout the specification and drawings.

The hollow portion or body of the receptacle to which my invention is shown as applied is referred to by letter A. The loop of the handle or main portion thereof is marked B.

The loop B is ordinarily formed of a strip of metal bent upon itself and provided with the additional bends C and D near the ends. The bends C and D are brought together or near each other, and the portions of the handle designated E and F above the meeting of the bends C and D and those portions designated G and H below that meeting location are arranged facing each other, leaving a suitable space between them, as illustrated. The ends E and G and usually the junction of bends C and D are soldered to the body of the cup at a position below the rim of the cup, substantially as shown. It is now clear that these open spaces may be brought into engagement with the rim of any suitable general receptacle, such as bucket J, and that the handle B, constructed as herein shown and described, enables the receptacle A to be suspended from the rim of a bucket either inside or out, bottom up or top up. In Fig. 3 the cup A is shown as suspended inside the bucket J with the bottom uppermost, and any liquid remaining in the cup A must drain into the bucket.

Having now described my invention and explained the mode of its operation, what I claim is—

1. A cup-handle comprising a loop, and having additional bends arranged near each other, the said handle having end portions secured to the cup whereby spaces or recesses are provided above and below the said additional bends enabling the cup to be suspended from the rim of a bucket in normal or inverted position, substantially as described.

2. A cup-handle consisting of a strip of metal bent into the form of a main loop, and having additional bends arranged near each other, the said handle having end portions secured to the cup whereby spaces or recesses are provided above and below the said additional bends enabling the cup to be suspended from the rim of a bucket in normal or inverted position, substantially as described.

In testimony whereof I affix my signature in presence of two witnesses.

GEORG F. WALKER.

Witnesses:
GEORGE W. SAMPLE,
JOHN LAWSON.